US012792628B2

(12) United States Patent
Sridharan et al.

(10) Patent No.: US 12,792,628 B2
(45) Date of Patent: Nov. 10, 2026

(54) REAL-TIME SEARCH ENGINE INDEXING AND SYNCHRONIZATION SYSTEM FOR RELATIONAL DATABASES

(71) Applicant: VERIZON PATENT AND LICENSING INC., Basking Ridge, NJ (US)

(72) Inventors: Prakash Sridharan, Chennai (IN); Mohanapriya Gopal, Chennai (IN); Ayoyimika Alaran, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 26 days.

(21) Appl. No.: 18/796,886

(22) Filed: Aug. 7, 2024

(65) Prior Publication Data

US 2026/0044529 A1 Feb. 12, 2026

(51) Int. Cl.

| | |
|---|---|
| ***G06F 16/27*** | (2019.01) |
| ***G06F 16/21*** | (2019.01) |
| ***G06F 16/22*** | (2019.01) |
| ***G06F 16/242*** | (2019.01) |
| ***G06F 16/2455*** | (2019.01) |
| ***G06F 16/28*** | (2019.01) |

(52) U.S. Cl.

CPC .......... *G06F 16/273* (2019.01); *G06F 16/219* (2019.01); *G06F 16/2228* (2019.01); *G06F 16/2435* (2019.01); *G06F 16/24561* (2019.01); *G06F 16/287* (2019.01)

(58) Field of Classification Search

CPC ............................ G06F 16/273; G06F 16/287

See application file for complete search history.

(56) References Cited

U.S. PATENT DOCUMENTS

| | | | | |
|---|---|---|---|---|
| 8,229,917 | B1 * | 7/2012 | Aneas | G06F 16/24545 707/713 |
| 11,935,416 | B1 * | 3/2024 | Motamedi | G06F 16/909 |
| 2004/0236713 | A1 * | 11/2004 | Silbersack | G06F 3/1285 |
| 2005/0063334 | A1 * | 3/2005 | Fnu | H04W 48/16 370/329 |
| 2007/0192343 | A1 * | 8/2007 | Faerber | G06F 16/2453 |
| 2007/0239798 | A1 * | 10/2007 | Shringi | G06F 16/2365 |
| 2008/0059196 | A1 * | 3/2008 | Huang | G06F 16/686 704/270 |
| 2011/0289093 | A1 * | 11/2011 | Loofbourrow | G06F 16/2272 707/E17.049 |
| 2012/0117086 | A1 * | 5/2012 | White | G06F 16/217 707/749 |

(Continued)

*Primary Examiner* — Allen S Lin

(57) ABSTRACT

A system for real-time indexing and synchronization of relational databases with a search engine cluster. The system can retrieve datasets using NTILE queries, serialize the data, and load the data into the search engine index via a bulk API. Changes in the relational database can be captured using triggers and stored in a delta metadata table with table identifier, record identifier and type of change. Periodic scans of the delta metadata table can identify the changed records, which can then be retrieved and used to update the search engine index. The system can support parallel processing of data chunks and dynamic adaptation to new database fields without code changes. Users can search the indexed data through an interface that allows attribute-based filtering and hierarchical display of search results.

20 Claims, 6 Drawing Sheets

(56) References Cited

U.S. PATENT DOCUMENTS

| | | | | |
|---|---|---|---|---|
| 2012/0296936 | A1* | 11/2012 | Nagatoshi | G06F 16/2453 707/E17.014 |
| 2015/0186478 | A1* | 7/2015 | Yan | G06F 16/14 707/722 |
| 2019/0095102 | A1* | 3/2019 | Wade | G06F 3/0653 |
| 2021/0209088 | A1* | 7/2021 | Zheng | G06F 16/2455 |
| 2021/0397971 | A1* | 12/2021 | Pardeshi | G06N 3/045 |
| 2022/0245146 | A1* | 8/2022 | Mimms | G06F 16/24532 |
| 2023/0093370 | A1* | 3/2023 | Battaglia | G06F 8/65 717/170 |

* cited by examiner

REAL-TIME SEARCH ENGINE INDEXING AND SYNCHRONIZATION SYSTEM FOR RELATIONAL DATABASES

BACKGROUND

Organizations often manage vast amounts of data encompassing various types of information such as customer details, billing addresses, and account information. This data is typically distributed across multiple data sources, making the process of efficiently searching and retrieving relevant information very challenging.

Existing systems face significant challenges in providing timely search capabilities for frequently changing large datasets. These systems often struggle with data processing, which can take an extended period of time to complete, thereby delaying the availability of updated information. Additionally, synchronizing changes in near real-time presents performance issues, especially when dealing with complex and highly structured data. Furthermore, the need to frequently add new fields without requiring code changes adds another layer of complexity to maintaining and updating the system.

DETAILED DESCRIPTION

Figure 1:
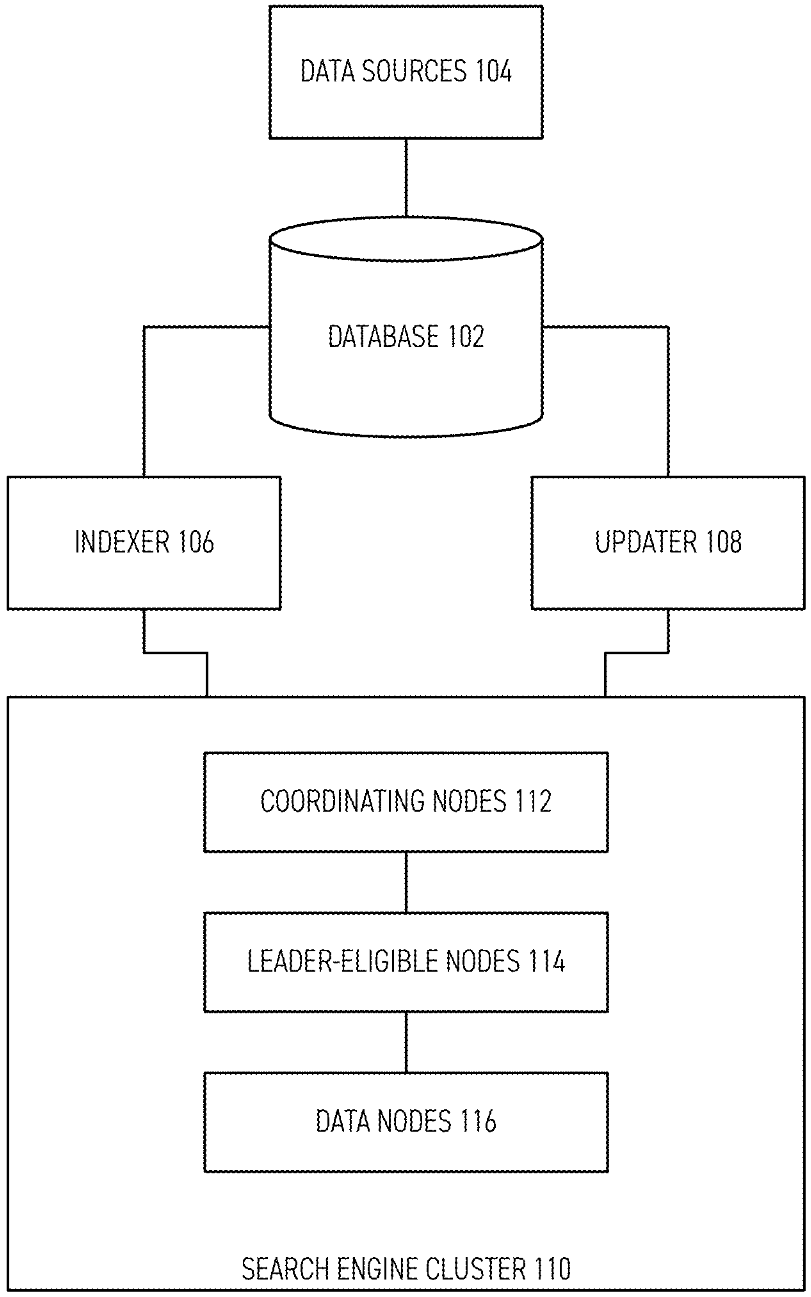
FIG. 1 is a block diagram illustrating a system for indexing and synchronizing a relational database with a search engine cluster.

The disclosure relates to data management systems, specifically to search engine indexing and synchronization for large frequently changing datasets in relational databases and data sources.

The system described herein integrates multiple data management techniques and technologies to process large, dynamic datasets in relational databases. It implements a combination of chunked data queries, bulk search engine indexing, and asynchronous data synchronization methods. The system architecture facilitates efficient data processing through parallel execution of queries, bulk loading of data into search indices, and incremental updates based on database changes. It employs a delta metadata approach to track modifications in the source database and propagate these changes to the search index. The system's design allows for adaptation to varying database schemas by storing query and join conditions in configurable tables, reducing the need for code alterations when database structures change. This approach enables the system to operate on complex, normalized database structures and manage large-scale datasets while maintaining index integrity and search performance.

The disclosed embodiments address the challenges in existing search engines by providing a solution for indexing and synchronizing data from relational databases with a search engine cluster. The system ensures that data is quickly loaded into the search engine index and that any changes in the underlying relational database are synchronized in near real-time. This approach eliminates the need for extensive code modifications when new fields are added, thereby streamlining the process of maintaining and updating the search capabilities. The system leverages techniques such as SQL NTILE queries, bulk API loading, and asynchronous delta processing to achieve efficient and timely data management.

The disclosed embodiments solve these and other problems via a system for efficiently indexing and searching large datasets from complex relational databases. The system retrieves data in chunks using SQL NTILE queries and converts it to JavaScript Object Notation (JSON) format before loading it into a search engine index using a specialized bulk API. To keep the index up-to-date, the system tracks changes in the database using triggers and delta metadata table(s). The system regularly checks this table for recent changes, fetches the latest versions/snapshots of modified records, and updates the search index accordingly. In some implementations, versions of modified records refers to a most recent state of individual records after modifications, while snapshots represent a broader capture of data that may include related records or entire table states.

The system can handle large datasets by splitting them into pieces or "chunks" and processing them in parallel using multiple concurrent instances. The system can work with normalized databases by joining data from multiple related tables when necessary. The system can use a delta scanner table to store SQL queries and join conditions, allowing it to adapt to changes in the database structure without requiring code modifications.

To optimize performance, the system can track the last processed delta point for each table, allowing it to retrieve only new changes since the previous synchronization. It can detect changes from various sources, including user interface updates, external system synchronizations, and extract-transform-load (ETL) processes.

Users can search the indexed data through an interface that allows for attribute-based filtering. Search results can then be displayed in a hierarchical view, showing relationships between records. The search process can include executing queries against the index, retrieving matching results, applying user-selected filters, and presenting the data in a structured format.

The disclosed embodiments include methods for implementing this system, as well as computer-readable media containing instructions for executing these methods. The disclosed embodiments also describe devices configured to perform these data indexing, synchronization, and search functions.

FIG. 1 is a block diagram illustrating a system for indexing and synchronizing a relational database with a search engine cluster.

In the illustrated system, data sources 104 can be communicatively coupled to a database 102. These data sources 104 may include various applications, systems, or processes that can generate or modify data stored in the database 102. For example, data sources 104 may encompass user interface applications where users can directly input or modify data, external systems that can synchronize data with the database 102, or extract-transform-load (ETL) processes that can periodically update the database with data from other sources. No limit is placed on the amount and type of data sources 104.

The database 102 can be a relational database management system (RDBMS) capable of storing and managing large volumes of data. In some implementations, database 102 may be a normalized database structure spread across multiple tables and multiple databases. The database 102 can be implemented using various RDBMS technologies such as Oracle, MySQL®, PostgreSQL®, or Microsoft SQL Server®.

The system can include an indexer 106 communicatively coupled to the database 102. The indexer 106 can be responsible for retrieving data from the database 102 and loading it into a search engine cluster 110. It can perform the initial data indexing process and can also be used for full re-indexing when necessary. The operation of indexer 106 will be described in more detail in the discussion of FIGS. 2 and 4.

An updater 108 can also be communicatively coupled to both the database 102 and the search engine cluster 110. The updater 108 can be responsible for detecting changes in the database 102 and synchronizing these changes with the search engine cluster 110. This component can ensure that the search index remains up to date with the latest data in the database. The operation of updater 108 will be described in more detail in the discussion of FIGS. 3 and 5.

The search engine cluster 110 can be the retrieval mechanism of the system, responsible for storing the indexed data and serving search requests. In some implementations, the search engine cluster 110 may be an Elasticsearch® cluster, although other search engine technologies such as Apache Solr® could be used. The search engine cluster 110 can be designed to provide fast and efficient search capabilities over large volumes of data.

Within the search engine cluster 110, there can be three types of nodes: coordinating nodes 112, leader-eligible (or master) nodes 114, and data nodes 116. Coordinating nodes 112 can be responsible for routing requests to the appropriate data nodes and aggregating results. When a search request is received, a coordinating node can determine which data nodes contain the relevant data, send the request to those nodes, and then combine the results before returning them to the client. Coordinating nodes can act as load balancers, distributing the workload across the cluster.

Leader-eligible (master) nodes 114 may be responsible for cluster-wide actions such as creating or deleting indices, tracking which nodes are part of the cluster, and allocating shards to nodes. One of the leader-eligible nodes can be elected as the leader node, which can take charge of these cluster-wide actions. If the current leader node fails, another leader-eligible node can be automatically elected to take its place, ensuring high availability of the cluster.

Data nodes 116 can store the indexed data and perform data-related operations such as CRUD (Create, Read, Update, Delete) operations, search, and aggregations. The actual indexed data can be divided into shards, which can be distributed across the data nodes. This sharding can allow for horizontal scalability, thus, as the volume of data grows, more data nodes can be added to the cluster to handle the increased load.

The foregoing components allow the system to efficiently index and search large volumes of data while maintaining near real-time synchronization with the source database, as will be discussed further herein. In brief, when the system is first set up or when a full re-index is required, the indexer 106 can retrieve data from the database 102. In some implementations, the indexer 106 can retrieve data in chunks, using, for example, SQL NTILE queries to divide the data into manageable portions. This approach can allow for parallel processing, significantly reducing the time required for indexing large datasets. The indexer can convert each chunk of data into a serialized format (e.g., JSON) expected by a search engine such as Elasticsearch®. In some implementations, the indexer 106 can then use a bulk API provided by the search engine to efficiently load the data into the search engine cluster 110. In some implementations, the indexer 106 can significantly reduce the time required for indexing large datasets. For example, in some implementations, the indexer 106 has been monitored as processing 560 million records in approximately six hours, compared to 48 hours using traditional methods with Elasticsearch® like Logstash®.

Once the initial indexing is complete, the system can keep track of any changes occurring in the database 102. This can be accomplished in response to database triggers. Whenever a record is inserted, updated, or deleted in any of the monitored tables, a trigger can fire and handled by updater 108 which can then record the change in a delta metadata table. This table can store the table identifier, record identifier, and the type of change (insert, update, or delete) for each modification.

The updater 108 can periodically scan the delta metadata table to identify recent changes. This scanning process can be implemented as an asynchronous job that runs at predefined intervals, for example, every twenty seconds. When changes are detected, the updater can retrieve the current versions/snapshots of the changed records from the database 102. If the database has a complex structure with data spread across multiple tables, the updater may need to perform join operations to reconstruct the complete record data.

Once the updater has retrieved the current versions of the changed records, it can update the corresponding records in the search engine cluster 110. This can be done using the update API provided by the search engine, which can allow for updates of individual documents without the need to re-index the entire dataset.

When a search request is received, it can be routed to one of the coordinating nodes 112 in the search engine cluster 110. The receiving coordinating node can analyze the query and distribute it to the data nodes 116. Each data node can search its local shards and return the results to the coordinating node. The coordinating node can then aggregate these results and return them to the client.

The system can include several optimizations to enhance its performance and flexibility. Both the indexer 106 and updater 108 can spawn multiple concurrent instances to process data in parallel. This can reduce the time required for both initial indexing and ongoing synchronization. The system can also store SQL queries and join conditions for each index and table in a scanner table. This can allow the system to dynamically adapt to new tables or fields added to the relational database without requiring code changes. When the database schema changes, administrators can update the scanner table, and the system can automatically adjust its indexing and synchronization processes accordingly. The scanner table functions as a metadata repository, storing not only SQL queries and join conditions, but also column mappings, data type conversions, and indexing rules. For example, if a new column "email" is added to a "customers" table, the system can automatically detect this change through database schema introspection. It then generates and stores a new query in the scanner table, such as "SELECT id, name, email FROM customers", based on predefined templates. This new query is immediately used for subsequent indexing and synchronization operations without manual intervention. Furthermore, the system can utilize a modular query builder that can construct complex queries dynamically based on the scanner table entries, allowing it to adapt to various schema changes, including new tables, columns, and relationships. In some implementations, the system can employ advanced data integrity checks during parallel processing, using techniques such as distributed transactions and conflict resolution algorithms to ensure consistency across all data chunks, even in the event of partial failures In some implementations, the system can maintain a record of the last processed delta point for each table. This can allow it to retrieve only the new changes since the previous synchronization, reducing unnecessary data transfer and processing. In some implementations, the system can detect and process changes originating from multiple sources, including application user interface updates, database synchronization from external systems, and ETL processes. This can be used to ensure that all data modifications are captured and reflected in the search index, regardless of their origin.

The system can store metadata describing indexing queries and delta synchronization processes for different tables in a configuration table. This metadata can be used to dynamically configure indexing and synchronization processes without requiring code changes, providing a high degree of flexibility and ease of maintenance.

The search functionality provided by this system can offer several advanced features when compared to existing search engines. Users can search the indexed data using various attributes. The search interface can allow users to specify multiple criteria to narrow down their search results. Search results can be displayed in a hierarchical fashion, showing relationships between records. This can be particularly useful in complex data structures where understanding the relationships between different entities is desired. Due to the near real-time synchronization between the database and the search index, the search results can reflect the most current data available in the system. The distributed nature of the search engine cluster can allow the system to maintain high performance even as the volume of data and number of concurrent users increase. The search functionality includes a hierarchical display of results. This feature allows users to visualize and understand relationships within the data. For example, when searching for a customer, the system can display not only the customer's details but also hierarchically linked information such as associated orders, support tickets, and account managers, providing a comprehensive view of the customer relationship.

Figure 2:
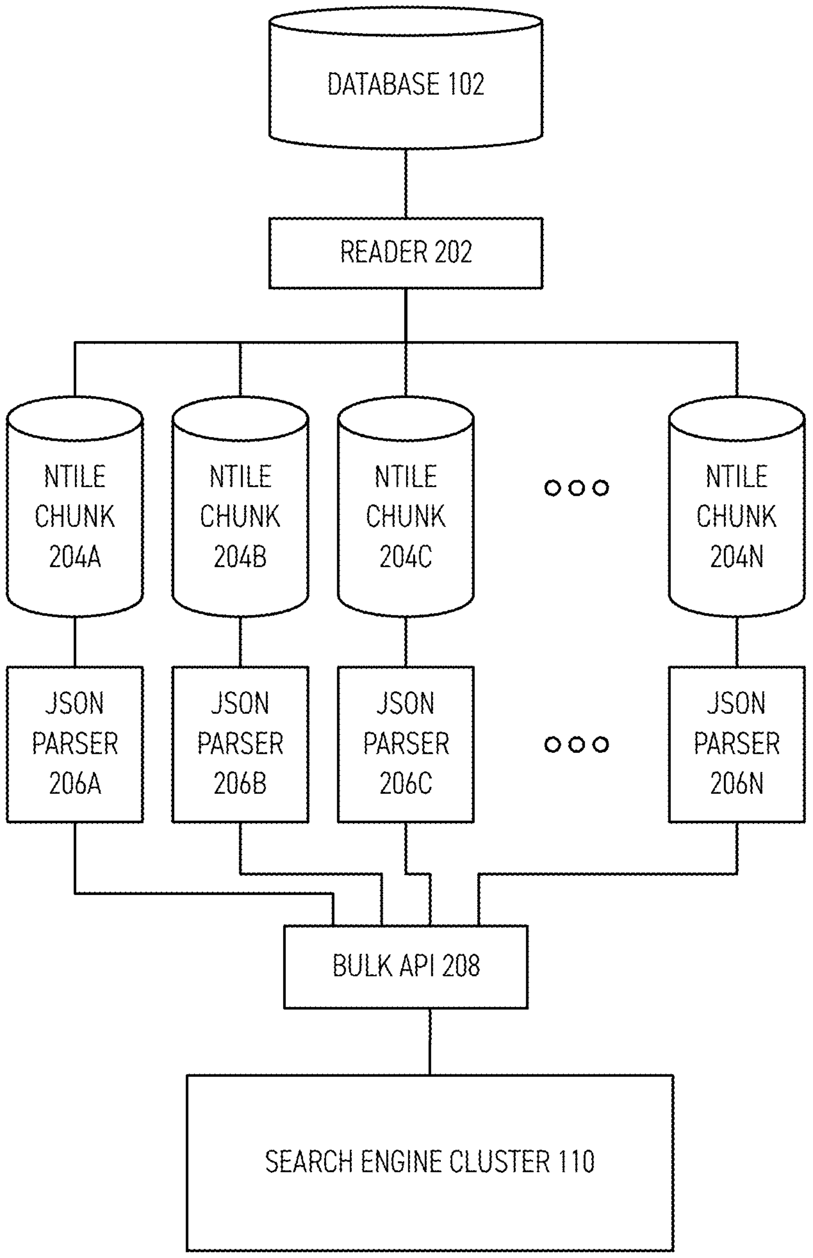
FIG. 2 is a block diagram illustrating the system for indexing data from a relational database into a search engine cluster.

FIG. 2 is a block diagram illustrating the system for indexing data from a relational database into a search engine cluster.

As discussed in connection with FIG. 1, indexer 106 is responsible for efficiently retrieving large datasets from the database 102 and loading them into the search engine cluster 110.

Indexer 106 includes a reader 202, which is responsible for retrieving data from the database 102. The reader 202 can handle large volumes of data efficiently by dividing the dataset into manageable chunks. This chunking approach allows the reader 202 to process large datasets that might otherwise overwhelm system resources if attempted to be processed all at once.

In some implementations, the reader 202 employs SQL NTILE queries to divide the dataset into a series of NTILE chunks 204A, 204B, 204C, through 204N. In some implementations, the NTILE function is a window function in SQL that allows for the division of ordered rows into a specified number of approximately equal groups. In some implementations, NTILE functions can be used to create a series of data chunks that can be processed independently and in parallel. While NTILE functions are discussed herein, similar techniques may also be used.

In the various implementations, the use of NTILE (or similar) queries can provide several advantages over existing technical solutions. In some implementations, NTILE queries may be used as they enable balanced partitioning of the data without requiring knowledge of the underlying data distribution or the need for complex custom partitioning logic. By dividing the dataset into chunks, the system can retrieve data in manageable portions, reducing the load on the database and preventing potential timeout issues that might occur when trying to retrieve very large datasets in a single query. Further, each chunk can be processed independently, allowing for parallel execution and significantly reducing the overall time required for indexing. Additionally, if the indexing process is interrupted for any reason, it can be resumed from the last successfully processed chunk, rather than having to start over from the beginning. Working with chunks also helps in managing memory more efficiently, as only a portion of the data needs to be held in memory at any given time.

The number of chunks (N) can be configured based on the size of the dataset and the available system resources. In some implementations, the system might use 10,000 records per chunk as a default, but this value can be adjusted as needed. This approach has demonstrated significant performance improvements in real-world applications. For instance, in tests with a dataset of 560 million records, the indexing time was reduced from 48 hours using traditional methods to just 6 hours using this NTILE approach, representing an eightfold speed improvement.

For each NTILE chunk (204A, 204B, 204C, . . . , 204N), there is a corresponding parser (206A, 206B, 206C, . . . , 206N). These parsers are responsible for converting the relational data retrieved from the database into a serialized format. As illustrated, in some implementations, the format may be JSON, which is the primary format for many search engines, including Elasticsearch®. However, other parsers and formats may be used.

In some implementations, the parsing process involves several steps. The parser maps each column from the relational database to a corresponding field in the serialized (e.g., JSON) structure. This mapping can be configured to handle different data types and to implement any necessary transformations. If the relational data involves multiple related tables, the parser can create nested structures to represent these relationships. The parser handles the conversion of database-specific data types to format-compatible types. For example, dates might be converted to ISO 8601 format, which is used in many serialized formats, including JSON. The parser can also ensure proper escaping of special characters. Depending on the configuration, the parser might perform certain optimizations, such as omitting null values or empty arrays, to reduce the size of the resulting serialized representations.

The use of multiple parsers (206A through 206N) allows for parallel processing of the NTILE chunks. In some implementations, each parser can work independently on its assigned chunk, further improving the efficiency of the indexing process.

Once the data has been converted to JSON format, it's passed to the bulk API 208. The bulk API 208 is a component that interfaces with the search engine cluster 110, using the search engine's bulk insertion capabilities to efficiently load large volumes of data.

As illustrated, instead of inserting documents one at a time, the bulk API allows for multiple documents to be inserted in a single request. This reduces the number of network round trips and improves overall insertion speed. By bundling multiple documents together, the bulk API makes more efficient use of network resources, reducing overhead and improving throughput. The bulk API can handle partial failures, where some documents in a batch are successfully inserted while others fail. It provides detailed error reporting, allowing for easy identification and handling of problematic documents. The size of each batch can be configured to balance between insertion speed and memory usage. Larger batch sizes generally provide better performance but require more memory. The bulk API can be configured with retry mechanisms to handle temporary failures, improving the robustness of the indexing process.

In various implementations, the indexer 106 can include optimizations to enhance its performance. For example, the indexer 106 spawn multiple reader and parser instances, each working on different chunks of the dataset. The number of concurrent processes can be configured based on the available system resources. Similarly, the size of the NTILE chunks can be dynamically adjusted based on the characteristics of the data and the performance of the system. For tables with fewer rows, the chunk size might be reduced to ensure optimal parallelization. In some implementations, the bulk API 208 can use batching algorithms to optimize the size of each bulk insertion request. For subsequent indexing operations after the initial full index, the system can be configured to only index new or modified records, reducing the time and resources required for keeping the search index up-to-date. If errors occur during the indexing process, the system logs them and continues with the next chunk. After the main indexing process is complete, it can retry failed chunks, ensuring that transient errors don't prevent a complete index from being built. The indexer monitors system resources such as CPU usage, memory consumption, and network bandwidth. It can dynamically adjust its operations to prevent overloading the system, ensuring stable performance even when dealing with very large datasets.

In some implementations, the indexer 106 can determine the optimal number of concurrent processes based on available system resources. Specifically, the indexer 106 can monitor CPU usage, memory consumption, and I/O capacity, dynamically adjusting the level of parallelism to maximize throughput without overwhelming the system. Relatedly, the indexer 106 can monitor key performance indicators such as CPU utilization, memory usage, I/O wait times, and network latency. Then, the indexer 106 can use these metrics in a machine learning model that dynamically adjusts the number of concurrent processes to optimize throughput while preventing resource exhaustion.

The indexer 106 is designed to handle varying data scenarios and complexities. By using the NTILE approach and parallel processing, the indexer can handle datasets with millions or even billions of records efficiently. For databases with complex, normalized schemas spanning multiple tables, the indexer can be configured to join data from related tables during the chunking process, ensuring that each serialized document contains all relevant information.

Figure 3:
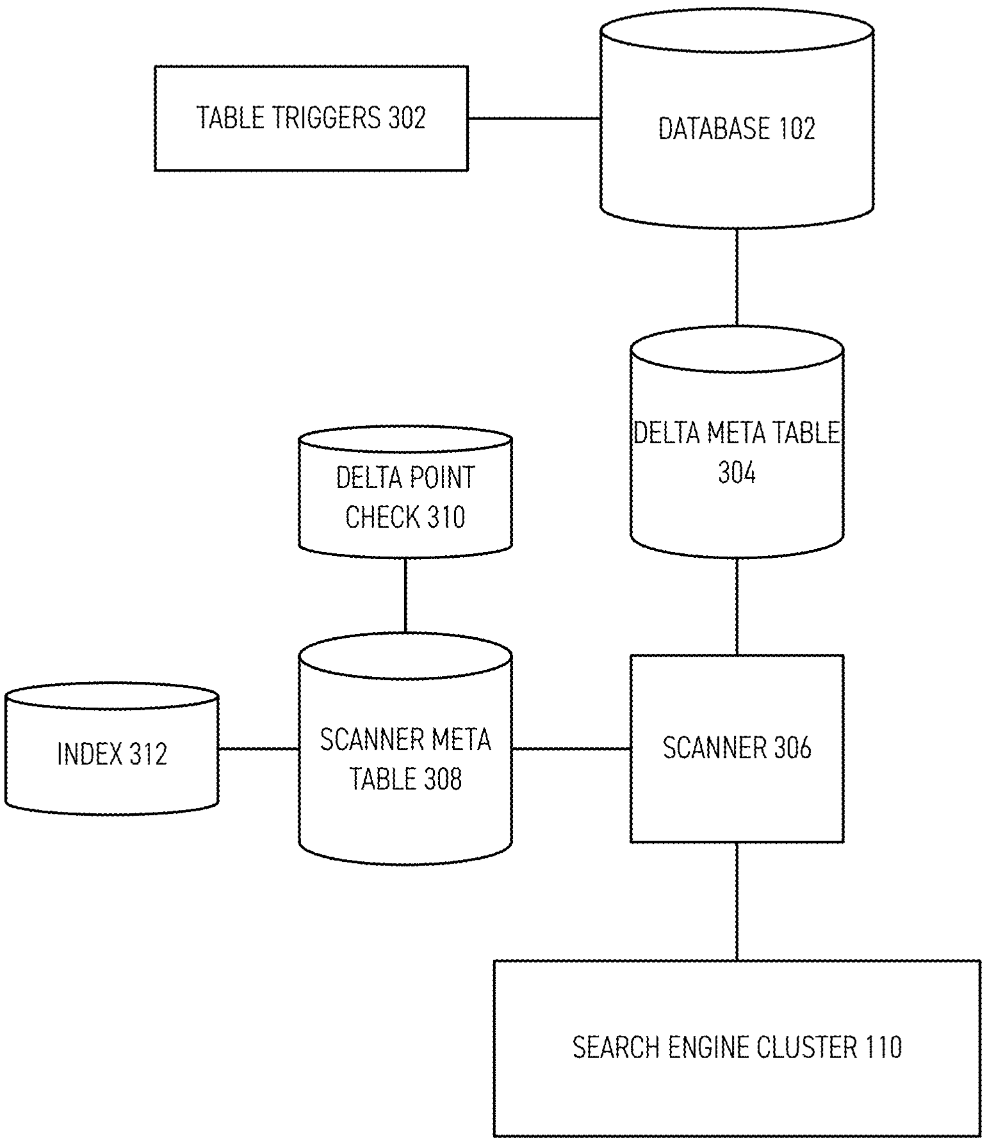
FIG. 3 is a block diagram illustrating a system for synchronizing between a relational database and a search engine cluster using delta metadata tables and scanners.

FIG. 3 is a block diagram illustrating a system for synchronizing between a relational database and a search engine cluster using delta metadata tables and scanners.

As illustrated, the system includes table triggers 302 in the database 102. In some implementations, these triggers can be configured to fire whenever a record is inserted, updated, or deleted in any of the monitored tables. When a trigger fires, it can capture essential information about the change, including the table identifier, the primary key of the affected record, and the type of operation (insert, update, or delete). This information can then be stored in a delta metadata table 304.

The delta metadata table 304 can store a log of all changes occurring in the monitored tables of the database 102. Each row in this table can represent a single change event, containing fields such as the table identifier, record identifier, timestamp of the change, and the type of change. The delta metadata table 304 can be designed for high-speed insertions, as it needs to keep up with potentially frequent updates in a busy database system. It can also be optimized for quick scanning, as it will be frequently queried by the synchronization process.

A scanner 306 is responsible for periodically checking the delta metadata table 304 for new changes. The scanner 306 can be implemented as an asynchronous job that runs at predefined intervals, for example, every 20 seconds. This interval can be configurable, allowing administrators to balance between the desire for near real-time updates and the need to minimize system load. The scanner 306 can use various querying techniques to identify new changes since its last run. For example, the scanner 306 can potentially utilize indexes on the timestamp or a monotonically increasing identifier in the delta metadata table 304.

When the scanner 306 identifies new changes, it can retrieve the necessary information to update the search engine index. However, the data in the delta metadata table 304 typically only contains identifiers of changed records, not the full record data. To get the current state of the changed records, the scanner 306 can query the main database tables. This process can be complicated in systems with complex, normalized database schemas where data for a single logical entity might be spread across multiple tables.

To handle this complexity, the system employs a scanner meta table 308. This table can store SQL queries and join conditions for each index and table in the relational database. When the scanner 306 needs to retrieve the full data for a changed record, it can look up the appropriate query in the scanner meta table 308. This approach allows the system to dynamically adapt to changes in the database schema without requiring code modifications. If a new table is added or the structure of existing tables changes, administrators can update the scanner meta table 308 with new queries, and the system can automatically adjust its behavior. The scanner meta table 308 allows the system to easily adapt to schema changes without, importantly, requiring code modifications. When database structures evolve, administrators can update the queries in this table, and the system automatically can adjust its behavior accordingly. For example, when a new column is added to a table in a customer's database, the system detects the change, updates the relevant queries, and begins indexing the new data immediately, without manual intervention or system downtime.

The scanner meta table 308 can contain entries for each table or index that needs to be synchronized. Each entry can include fields such as the table identifier, the SQL query to retrieve full record data, and any necessary join conditions.

The queries stored in this table can be complex, involving multiple joins across related tables to reconstruct complete record data.

As the scanner 306 processes changes, it can keep track of its progress using a delta point check 310. The delta point check 310 can store the last processed change for each table, allowing the scanner to resume its work in case of interruptions. This mechanism also enables the system to handle a large backlog of changes without overwhelming system resources, as it can process changes in manageable batches.

Once the scanner 306 has retrieved the full, current data for changed records, it can update the corresponding documents in the search engine index 312. The search engine index 312 represents the data stored in the search engine cluster 110, organized for efficient searching and retrieval, as discussed in connection with FIG. 1. The update process can utilize the search engine's update API, which can allow for updating individual fields of a document without having to reindex the entire document.

The update synchronization process can handle various types of changes. For inserted records, new documents can be added to the search engine index 312. For updated records, existing documents in the index can be modified to reflect the new state of the data. For deleted records, the corresponding documents can be removed from the index. The system can also handle more complex scenarios, such as records that move between indices due to changes in their attributes.

In some implementations, the synchronization process can handle changes originating from multiple sources. These can include updates made through application user interfaces, synchronization processes from external systems, and changes resulting from extract-transform-load (ETL) processes. By capturing all these changes in the delta metadata table 304, the system can ensure that the search index remains consistent with the database regardless of how the changes were initiated.

In some implementations, the update synchronization process can utilize various optimizations to enhance its performance and reliability. For example, the scanner 306 can employ parallel processing techniques, spawning multiple threads to handle different tables or batches of changes simultaneously. This can improve the speed of synchronization, especially in systems with a high volume of changes across many tables. The system can also implement a batching strategy. Instead of updating the search index for each change individually, it can group multiple changes into batches. This can reduce the number of API calls to the search engine, improving overall efficiency. The batching strategy can be adaptive, adjusting the batch size based on factors such as the current system load, the type of changes being processed, and the performance characteristics of the search engine cluster. In some implementations, the system can implement retry mechanisms for failed updates, ensuring that transient issues don't result in permanent inconsistencies between the database and the search index. It can also log detailed information about any errors encountered, facilitating troubleshooting and system monitoring. In some implementations, the update synchronization process can also include mechanisms for handling edge cases and ensuring data integrity. For example, it can detect and resolve conflicts that might arise when the same record is updated multiple times in rapid succession. It can also handle scenarios where a record is updated and then quickly deleted, ensuring that such changes are processed in the correct order. To maintain optimal performance over time, the system can include self-monitoring and optimization capabilities. It can track metrics such as the average time taken to process changes, the size of the change backlog, and the frequency of errors. Based on these metrics, it can automatically adjust its behavior, such as increasing or decreasing the scanning interval or adjusting batch sizes. It can also generate alerts for system administrators if certain thresholds are exceeded, allowing for proactive management of the synchronization process.

The update synchronization process can be designed to be resilient to various types of failures. If the scanner 306 crashes or is stopped, it can resume operation from the last processed delta point when restarted. If the search engine cluster becomes temporarily unavailable, the system can queue up changes and apply them when connectivity is restored. This resilience helps ensure that the search index eventually becomes consistent with the database, even in the face of system disruptions.

In scenarios where the volume of changes is extremely high, the system can implement additional strategies to maintain performance. It can prioritize certain types of changes, ensuring that the most critical updates are processed first. It can also perform change coalescing, where multiple updates to the same record within a short time window are combined into a single update operation.

Figure 4:
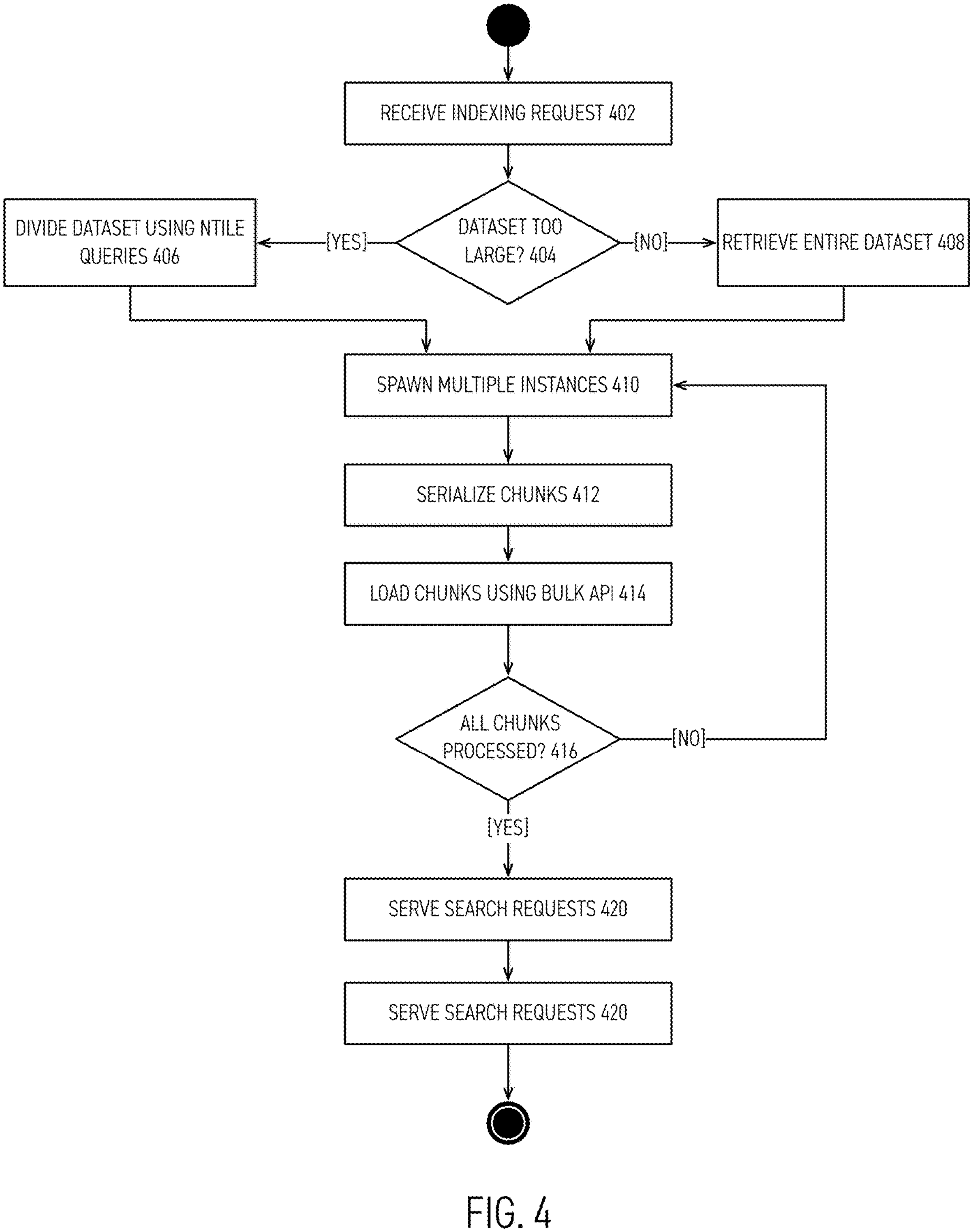
FIG. 4 is a flow diagram illustrating a process of indexing a dataset from a relational database into a search engine index using NTILE queries and a bulk data access API.

FIG. 4 is a flow diagram illustrating a process of indexing a dataset from a relational database into a search engine index using NTILE queries and a bulk API.

In step 402, the method can include receiving an indexing request.

In some implementations, this request can be triggered by various events, such as the initial setup of the system, a scheduled full re-indexing operation, or a manual request initiated by an administrator whenever there is a change in index data structure. The indexing request typically specifies the dataset to be indexed, which may include multiple tables from a complex, highly normalized relational database structure. In enterprise-level applications, this database structure might span more than 30 tables, containing millions or even billions of records.

In step 404, the method can include determining if the dataset is too large to be processed as a single unit.

This decision can be made to optimize performance and is based on predefined thresholds or system capabilities. The method can analyze factors such as the total number of records, the complexity of the data structure, and the available computational resources.

If the dataset is determined to be too large for single-unit processing, the method can proceed to step 406, where it can divide the dataset using NTILE queries.

As described, NTILE is a SQL window function that allows for the division of ordered rows into a specified number of approximately equal groups. In the context of the method, it can be used to create a series of data chunks that can be processed independently and in parallel. In some implementations, the number of chunks can be dynamically determined based on the size of the dataset and the available system resources. In some implementations, the method may use 10,000 records per chunk as a default, but this can be adjusted as needed for optimal performance.

If the dataset is not too large, the method can proceed directly to step 408, where it can retrieve the entire dataset at once. This approach is suitable for smaller datasets where the overhead of chunking might outweigh the benefits.

In step 410, the method can spawn multiple instances of a parser to process the data chunks in parallel.

In some implementations, this step allows the method to improve performance after utilizing windowed queries such as NTILE queries. By utilizing parallel processing, the indexing time for large datasets can be drastically reduced. In some implementations, the method can determine the optimal number of concurrent processes based on available system resources. For example, the method may continuously monitor key performance indicators such as CPU utilization, memory usage, I/O wait times, and network latency. These metrics can then be used in a machine learning model that dynamically adjusts the number of concurrent processes to optimize throughput while preventing resource exhaustion.

In step 412, the method can convert the data chunks to a serialized format.

In some implementations, the serialized format may be JSON or a similar type of format. In some implementations, the conversion prepares the data for insertion into the search engine index. The parsing process involves several steps. In some implementations, the parser maps each column from the relational database to a corresponding field in the serialized structure. This mapping can be configured to handle different data types and to implement any necessary transformations. If the relational data involves multiple related tables, the parser can create nested structures to represent these relationships. The parser can handle the conversion of database-specific data types to format-specific compatible types. For example, dates might be converted to ISO 8601 format. The parser can also ensure proper escaping of special characters to maintain the integrity of the serialized structure. Depending on the configuration, the parser might perform certain optimizations, such as omitting null values or empty arrays, to reduce the size of the resulting serialized documents. The use of multiple JSON parsers allows for parallel processing of the NTILE chunks. Each parser can work independently on its assigned chunk, further improving the efficiency of the indexing process.

In step 414, the method can load the serialized chunks into the search engine index using a bulk API.

In some implementations, this approach allows for efficient insertion of large volumes of data. Instead of inserting documents one at a time, the bulk API allows for multiple documents to be inserted in a single request. This significantly reduces the number of network round trips and improves overall insertion speed. By bundling multiple documents together, the bulk API makes more efficient use of network resources, reducing overhead and improving throughput. The bulk API can handle partial failures, where some documents in a batch are successfully inserted while others fail. It provides detailed error reporting, allowing for easy identification and handling of problematic documents. The size of each batch can be configured to balance between insertion speed and memory usage. Larger batch sizes generally provide better performance but require more memory. The bulk API can be configured with retry mechanisms to handle temporary failures, improving the robustness of the indexing process.

In step 416, the method can check if all chunks have been processed. This step ensures that the entire dataset has been indexed. The method can keep track of which chunks have been successfully processed and inserted. This allows for resumability in case of interruptions and provides progress reporting.

If all chunks have not yet been processed, the method returns to step 410 to continue processing the remaining chunks. Thus, the method can continue until all chunks have been indexed.

Once all chunks have been processed, the method can proceed to step 420, where it can begin responding to search requests using the newly indexed data. At this point, the search engine index contains a complete and up-to-date representation of the dataset from the relational database. Users can now perform searches across the entire dataset.

Figure 5:
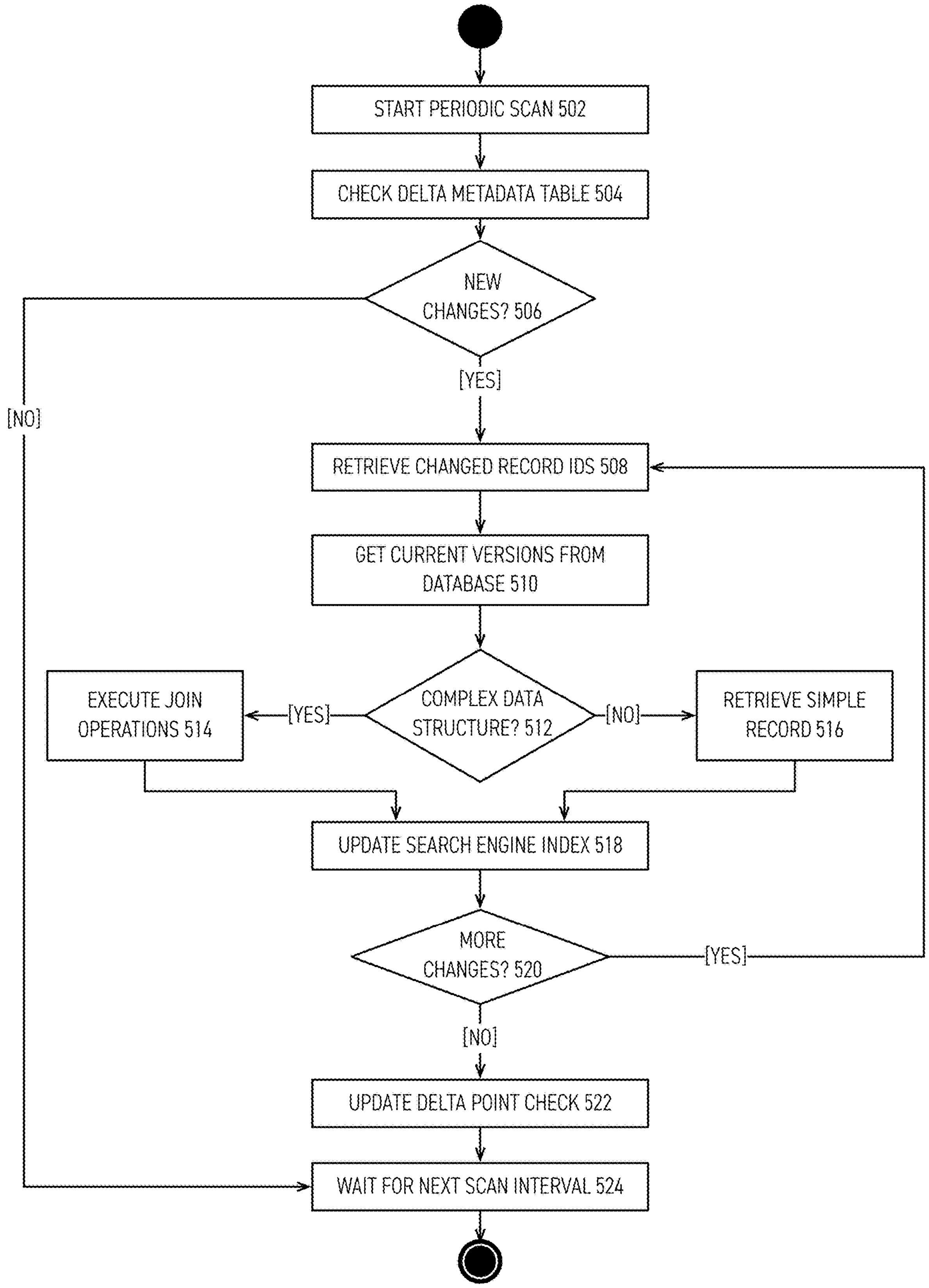
FIG. 5 is a flow diagram illustrating a periodic scan process for synchronizing changes from a relational database to a search engine index.

FIG. 5 is a flow diagram illustrating a periodic scan process for synchronizing changes from a relational database to a search engine index.

In step 502, the method can start a periodic scan.

In some implementations, this scan is typically implemented as an asynchronous job that runs at predefined intervals, for example, every 20 seconds. The frequency of these scans can be configurable, allowing administrators to balance between the desire for near real-time updates and the need to minimize system load.

In step 504, the method can check the delta metadata table.

This table serves as a log of all changes occurring in the monitored tables of the database. Each row in this table can represent a single change event, containing fields such as the table identifier, record identifier, timestamp of the change, and the type of change (insert, update, or delete). The delta metadata table is designed for high-speed insertions and can be optimized for quick scanning as discussed previously.

In step 506, the method can determine if there are new changes in the delta metadata table.

In some implementations, the method can use querying techniques to identify new changes since its last run, for example, utilizing indexes on the timestamp or a monotonically increasing identifier in the delta metadata table. If no new changes are detected, the process can proceed to step 524, where it waits for the next scan interval before starting the process again.

If new changes are detected, the method can proceed to step 508, where it can retrieve the identifiers of the changed records. In some implementations, this step involves capturing information about the change, such as the table identifier, the primary key of the affected record, and the type of operation (insert, update, or delete), etc.

In step 510, the method can get the current versions of the changed records from the database. As discussed, the data in the delta metadata table typically only contains identifiers of changed records, not the full record data. Thus, to get the current state of the changed records, the method can query the main database tables as part of step 510 to retrieve the current versions of the changed records.

In step 512, the method can determine if the data structure is complex or simple. As used herein a complex data structure refers to a data structure that is spread across at least two database tables, thus requiring a JOIN or similar operation to retrieve the entire record.

If the data structure is determined to be complex, the method can proceed to step 514, where it executes join (or similar) operations to reconstruct the complete record data. This process can be complicated, especially in highly normalized database structures where a logical entity's data might be spread across more than thirty or more tables. To handle this complexity, the method can employ a scanner meta table. This table stores SQL queries and join conditions for each index and table in the relational database. When the method needs to retrieve the full data for a changed record, it can look up the appropriate query in the scanner meta table. This approach allows the method to dynamically adapt to changes in the database schema without requiring code modifications.

If the data structure is not complex, the method can proceed to step 516, where it retrieves the record directly. In some implementations, this can include fetching the record directly from a single table without the need for join operations or other complex SQL operations.

In step 518, the method can update the search engine index with the retrieved record data.

In some implementations, the update process can utilize the search engine's update API, which allows for updating individual fields of a document without having to reindex the entire document. For inserted records, new documents can be added to the index. For updated records, existing documents in the index can be modified to reflect the new state of the data. For deleted records, the corresponding documents can be removed from the index.

In step 520, the method can check if there are more changes to process. If yes, it returns to step 508 to process the next change. This decision ensures that all detected changes are processed and synchronized with the search engine index.

If there are no more changes, the method can proceed to step 522, where it updates the delta point check. The delta point check stores the last processed change for each table, allowing the method to efficiently resume its work in case of interruptions. This mechanism also enables the method to handle a large backlog of changes without overwhelming system resources, as it can process changes in manageable batches.

Finally, the method returns to step 524, where it waits for the next scan interval before starting the process again. This ensures that the synchronization process runs continuously, maintaining the consistency between the relational database and the search engine index.

Figure 6:
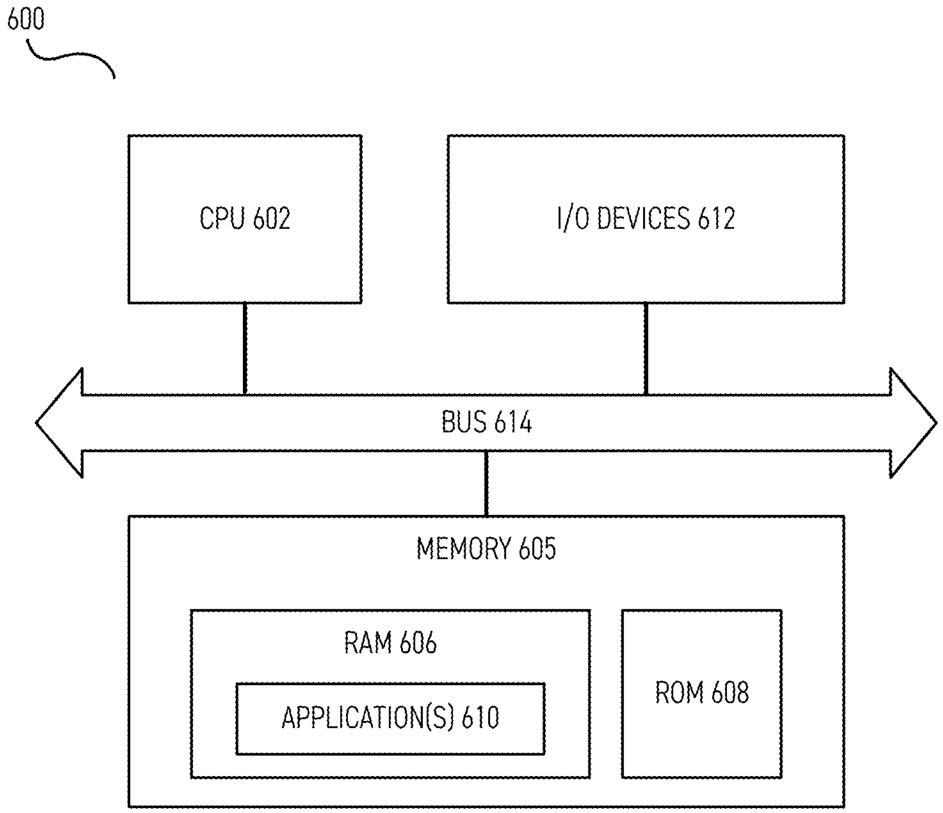
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 605 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 605 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 605 illustrates an example of a non-transitory computer storage media for the storage of information such as computer-readable instructions, data structures, program modules, or other data. Memory 605 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving a request to index a dataset from a relational database into a search engine index;

retrieving the dataset from the relational database using a plurality of SQL NTILE queries, each query retrieving a chunk of the dataset by dividing ordered rows into groups;

converting each chunk to a serialized format compatible with the search engine;

spawning multiple concurrent loader instances to load the chunks in the serialized format into the search engine index in parallel, wherein each loader instance processes a respective chunk of the dataset;

loading the serialized chunks of the dataset into the search engine index using a bulk application programming interface of the search engine index;

detecting changes to records in the relational database by using database triggers to capture and store identifiers of changed records in a delta metadata table;

scanning the delta metadata table to identify the changed records;

retrieving current versions of the changed records from the relational database using SQL queries and join conditions stored in a scanner meta table, and dynamically adapting to changes in database schema based on the SQL queries and join conditions stored in the scanner meta table without requiring code modifications;

updating corresponding records in the search engine index with the current versions of the changed records; and responding to search requests using the search engine index.

2. The method of claim 1, wherein detecting changes to records comprises:

using database triggers to detect changes to records in the relational database; and storing table identifiers, record identifiers, and change actions for changed records in the delta metadata table.

3. The method of claim 1, wherein scanning the delta metadata table comprises executing an asynchronous job at a predefined time interval to scan the delta metadata table.

4. The method of claim 1, further comprising: storing metadata describing indexing queries and delta synchronization processes for different tables in a configuration table; and using the metadata to dynamically configure indexing and synchronization processes without code changes.

5. The method of claim 1, further comprising: tracking last processed delta points for each table; and using the last processed delta points to retrieve new changes since a previous synchronization.

6. The method of claim 1, wherein updating corresponding records in the search engine index comprises retrieving full record data for changed records by joining data from multiple related tables in the relational database.

7. The method of claim 1, further comprising: providing a user interface allowing users to search the dataset via the search engine index and using one or more attributes; and displaying search results in a hierarchical fashion showing relationships between records.

8. The method of claim 1, wherein the relational database comprises a normalized data structure, and wherein retrieving current versions of the changed records comprises executing join operations across multiple related tables to reconstruct a complete record data.

9. The method of claim 1, wherein detecting changes to records in the relational database comprises detecting changes originating from multiple sources including one or more of application user interface updates, database synchronization from external systems, and data transformation processes.

10. The method of claim 1, further comprising: storing, in a scanner table, data queries and join conditions for each index and table in the relational database; and utilizing the data queries and join conditions to dynamically adapt to new tables or fields added to the relational database.

11. The method of claim 1, further comprising: receiving a search query from a user; executing the search query against the search engine index; retrieving search results matching the search query; applying one or more filters to the search results based on user-selected attributes; and displaying the search results in a hierarchical view that illustrates relationships between records.

12. The method of claim 1, wherein the delta metadata table stores, for each changed record, a table identifier, a record identifier, and a change action type indicating whether the change is an insert operation, an update operation, or a delete operation.

13. A non-transitory computer-readable storage medium for tangibly storing computer program instructions capable of being executed by a computer processor, the computer program instructions defining steps of:

receiving a request to index a dataset from a relational database into a search engine index;

retrieving the dataset from the relational database using a plurality of SQL NTILE queries, each query retrieving a chunk of the dataset by dividing ordered rows into groups;

converting each chunk to a serialized format compatible with the search engine;

spawning multiple concurrent loader instances to load the chunks in the serialized format into the search engine index in parallel, wherein each loader instance processes a respective chunk of the dataset;

loading the serialized chunks of the dataset into the search engine index using a bulk application programming interface of the search engine index;

detecting changes to records in the relational database by using database triggers to capture and store identifiers of changed records in a delta metadata table;

scanning the delta metadata table to identify the changed records;

retrieving current versions of the changed records from the relational database using SQL queries and join conditions stored in a scanner meta table, and dynamically adapting to changes in database schema based on the SQL queries and join conditions stored in the scanner meta table without requiring code modifications;

updating corresponding records in the search engine index with the current versions of the changed records; and responding to search requests using the search engine index.

14. The non-transitory computer-readable storage medium of claim 13, the computer program instructions further defining steps of: serializing each chunk of the dataset into a JSON format before loading into the search engine index.

15. The non-transitory computer-readable storage medium of claim 13, the computer program instructions further defining the steps of: storing, in a scanner table, SQL queries and join conditions for each index and table in the relational database;

utilizing the SQL queries and join conditions to dynamically adapt to new tables or fields added to the relational database; and executing a periodic scan of the delta metadata table at preconfigured intervals.

16. The non-transitory computer-readable storage medium of claim 13, the computer program instructions further defining the steps of: receiving a search query from a user; executing the search query against the search engine index; retrieving search results matching the search query; applying one or more filters to the search results based on user- selected attributes; and displaying the search results in a hierarchical view that illustrates relationships between records.

17. The non-transitory computer-readable storage medium of claim 13, the computer program instructions further defining the steps of: tracking last processed delta points for each table; and using the last processed delta points to retrieve new changes since a previous synchronization.

18. A device comprising: a processor configured to:

receive a request to index a dataset from a relational database into a search engine index;

retrieve the dataset from the relational database using a plurality of SQL NTILE queries, each query retrieving a chunk of the dataset by dividing ordered rows into groups;

convert each chunk to a serialized format compatible with the search engine;

spawn multiple concurrent loader instances to load the chunks in the serialized format into the search engine index in parallel, wherein each loader instance processes a respective chunk of the dataset;

load the serialized chunks of the dataset into the search engine index using a bulk application programming interface of the search engine index;

capture changes to records in the relational database by using database triggers to capture and store identifiers of changed records in a delta metadata table;

periodically scan the delta metadata table to identify the changed records;

retrieve current versions of the changed records from the relational database using SQL queries and join conditions stored in a scanner meta table, and dynamically adapt to changes in database schema based on the SQL queries and join conditions stored in the scanner meta table without requiring code modifications;

update corresponding records in the search engine index with the current versions of the changed records; and serve search requests using the search engine index.

19. The device of claim 18, wherein the processor is further configured to: store, in a scanner table, SQL queries and join conditions for each index and table in the relational database; utilize the SQL queries and join conditions to dynamically adapt to new tables or fields added to the relational database; and execute a periodic scan of the delta metadata table at preconfigured intervals.

20. The device of claim 18, wherein the processor is further configured to: track last processed delta points for each table; and use the last processed delta points to retrieve new changes since a previous synchronization.

* * * * *